United States Patent [19]

Lyda

[11] Patent Number: 5,252,203

[45] Date of Patent: Oct. 12, 1993

[54] DEVICE FOR REMOVING WATER FROM FUEL TANKS

[76] Inventor: Samuel J. Lyda, Rte. 3, Box 360, Flat Rock, Ala. 35966

[21] Appl. No.: 951,652

[22] Filed: Sep. 25, 1992

Related U.S. Application Data

[63] Continuation-in-part of Ser. No. 615,313, Nov. 19, 1990, abandoned.

[51] Int. Cl.⁵ ............................................. B01D 15/00
[52] U.S. Cl. .................................. 210/172; 210/238; 210/282; 210/490; 210/497.01; 210/689; 210/DIG. 6
[58] Field of Search ............... 210/679, 689, 266, 282, 210/484–486, 488–491, 495, 496, 497.01, DIG. 6, 238, 172

[56] References Cited

U.S. PATENT DOCUMENTS

| | | | |
|---|---|---|---|
| 3,951,812 | 4/1976 | Hsu | 210/282 |
| 4,419,236 | 12/1983 | Hsu | 210/679 |
| 4,615,065 | 10/1986 | Demetriades | 15/229.2 |
| 4,747,960 | 5/1988 | Freeman et al. | 210/689 |
| 4,758,350 | 7/1988 | Pitts et al. | 210/484 |
| 4,787,949 | 11/1988 | Cole et al. | 210/689 |
| 4,861,470 | 8/1989 | Casey | 210/DIG. 6 |
| 5,130,018 | 7/1992 | Tolman et al. | 210/282 |

Primary Examiner—Ivars Cintins
Attorney, Agent, or Firm—Phillips & Beumer

[57] ABSTRACT

A device for removing water from an aqueous phase at the bottom of a hydrocarbon fuel tank has an elongated tubular frame with open areas defined by longitudinal members and circumferential ribs. A pad of cotton carrying a coating of highly water-absorbent particles on its inner surface is disposed over the frame, and the pad is enclosed on the outside by one or more layers of cotton muslin. An outside cover of a plastic mesh placed over the fabric provides a limit to outward expansion of the pad upon absorption of water and forces expansion of the particles to occur in a radially inward direction. Absorption of water is enhanced by treating the pad with an aqueous solution of a surfactant and by keeping the device enclosed so as to retain its moistened condition until being placed in use. An elongated metal rod placed inside the tube along its axis serves both as a weight to retain the device in place and as a means for grounding any static electricity.

12 Claims, 1 Drawing Sheet

DEVICE FOR REMOVING WATER FROM FUEL TANKS

CROSS REFERENCE TO RELATED APPLICATION

This application is a continuation-in-part of my prior application Ser. No. 07/615,313, filed Nov. 19, 1990, now abandoned.

1. Field of the Invention

This invention relates to removal of water from hydrocarbon fuel tanks.

2. Background of the Invention

The presence of water in fuel tanks has resulted in continuing problems. Water from sources such as moist air tends to collect in engine fuel tanks or stationary storage tanks, forming an aqueous phase that settles to the bottom of the tank. Various contaminants may accumulate in the aqueous phase over an extended storage period, producing gums or slimes that have an adverse effect on an engine's performance if they become mixed with the fuel. The collected water may also freeze in cold weather, blocking the flow of fuel. An effective means for removing the water phase from fuel tanks as by absorbing it and periodically replacing the absorbing device is therefore needed.

Various water-absorbing devices for use in fuel tanks are disclosed in prior patents. U.S. Pat. No. 4,861,469, issued Aug. 29, 1989, to Rossi et al., discloses a cylindrical container having a rigid, ribbed structural cage and a screen enclosure, with a dry particulate absorber, in particular, a cross-linked polyacrylamide copolymer placed in the container. The screen allows passage of liquid fuel and any water contained therein into the container, while retaining the particulate absorber. This device does not use any fabric or absorbent pad, but rather relies solely on direct contact of the water with the absorbent polymer particles for water absorption. Another approach is disclosed in U.S. Pat. No. 4,758,350, issued Jul. 19, 1988, to Pitts et al. This patent is concerned with an absorbent device having a highly absorbent material contained in a flexible fabric tube insertable into a fuel tank. The fabric container is made of untwisted filamentous nylon or rayon yarn densely woven with no well defined porosity above 100 microns, such a fabric said to be required to contain the hydrophilic absorbent and the gel formed upon hydration by reaction with water. This fabric is wetted by hydrocarbon fuels as well as by water, thus requiring treatment of the fabric with a material, for example, polyvinylalcohol, that is insoluble in the fuel but soluble in water to prevent absorption of the fuel by the container. Removal of static electricity by coating of the fabric with a surfactant and producing an externally grounded conducting system are also disclosed in this patent. The patent further discloses an embodiment wherein a strip of porous cloth material such as muslin or cheesecloth with a slurry of hydrophilic material coated on the cloth is located internally in the device, inside the treated fabric container.

It is desired to provide an improved water-absorber device and method which would make use of the wicking action and absorptive capability of a water-wettable supporting pad and a water-wettable containment fabric in addition to the absorption obtained from highly absorptive polymer particles. A structural arrangement providing control of expansion forces resulting from absorption and effective containment of absorbing materials is also needed.

SUMMARY OF THE INVENTION

The present invention is directed to a device and method for removing water from an aqueous phase at the bottom of a hydrocarbon-containing fuel tank. The device comprises an elongated, generally cylindrical container adapted for insertion into and removal from a tank through a conventional opening, with specified water-absorbing materials disposed in a layered arrangement inside the container. Structural features are provided to obtain effective contact of absorbent materials with water, to prevent loss of absorbent into the tank, and to prevent outward expansion such as would cause the device to become lodged in the tank.

The device has a rigid tubular frame with a large proportion of open area defined therein so as to allow expanding absorbent material to be forced inward, filling the inner volume of the frame as water accumulates. A pad of water-wettable, unwoven fibrous material such as cotton is disposed outside of the frame and covering the wall of the frame. Particles of a highly water-absorbent polymeric material are coated onto and adhered to the pad, preferably on the inside surface of the pad, to provide further absorption capability. At least one layer of a tightly-woven, water-wettable fabric such as cotton muslin encloses the pad to prevent loss of polymer particles into the tank. The pad and fabric layers come into contact with any aqueous phase along the length of the device and cause the water to move inwardly to the adhered polymer particles by wicking or capillary action. Any need for direct contact of the water with the polymer particles is thereby avoided.

An outer sleeve of an open mesh plastic screen material is disposed outside the fabric layer to restrain the device from undergoing substantial expansion in a radially outward direction and thus to force the polymer particles to expand inwardly through the tubular frame. The pad and fabric are treated to obtain enhanced absorption of water by moistening them and contacting them with a selected surfactant. Antifreeze may also be added to prevent freezing of the absorbed water. An elongated rod of an electrically conductive metal such as an iron alloy may be located inside the container to anchor the device in place and to prevent accumulation of static electricity.

Devices embodying the invention provide highly effective absorption of water, consistent with directional control of expanding absorbents and containment of polymer particles.

BRIEF DESCRIPTION OF THE DRAWING

The sole drawing figure is a perspective view of an absorber device embodying the invention, partially cut away to show its layered construction.

DESCRIPTION OF THE PREFERRED EMBODIMENT

Figure 1:
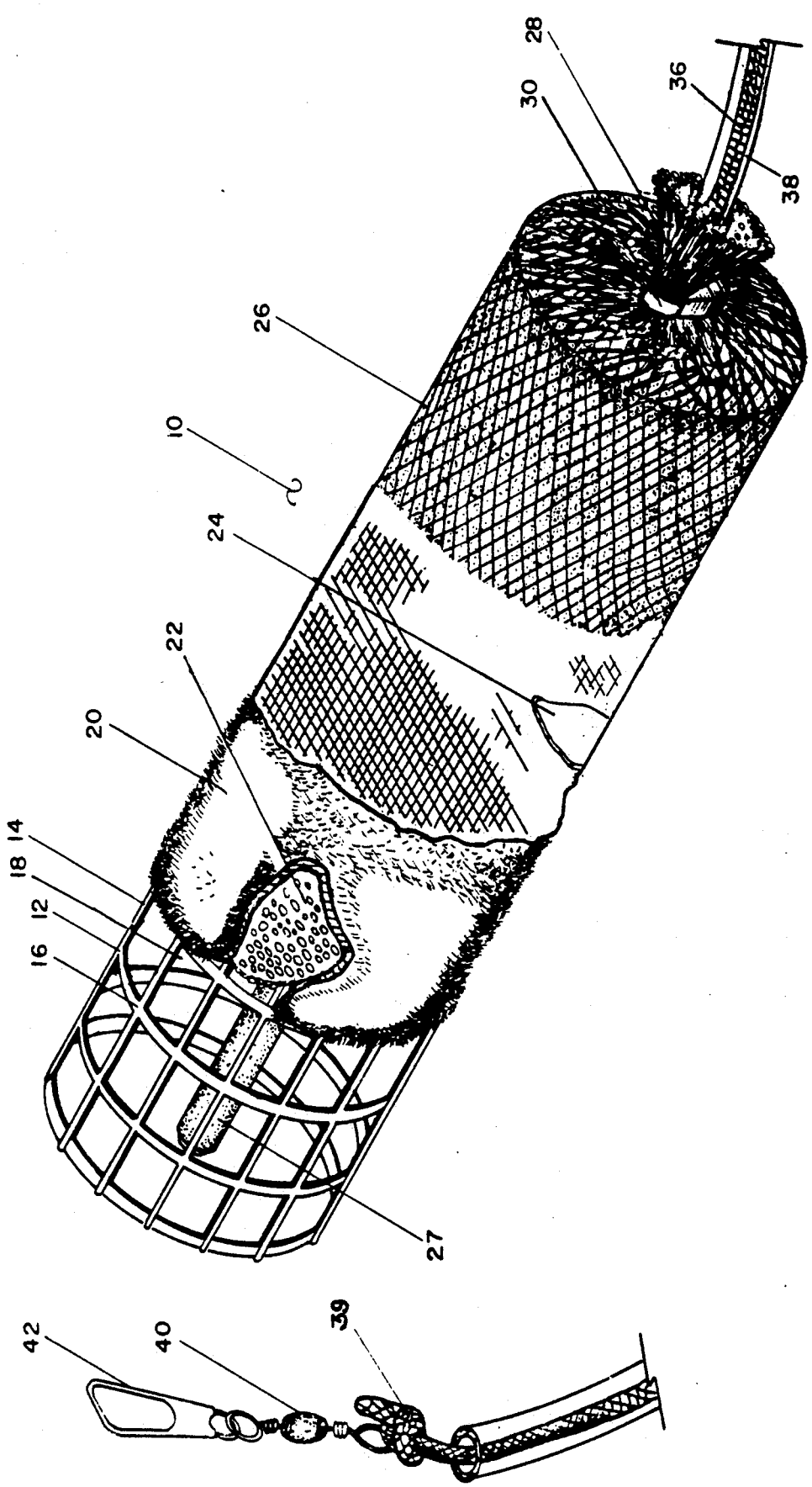

Referring to the drawing, there is shown an absorber device 10 for removing water from a fuel tank. The device has a generally cylindrical shape and is sized so as to be insertable into and removable from a tank through a conventional fuel cap opening. In use, the absorber device is placed in the bottom of a fuel tank where it will come into contact with any water that has collected in a separate phase below the hydrocarbon liquid.

The absorber device has a tubular frame 12 made up of longitudinal members 14 and circumferential circular ribs 16 intersecting with members 14 and defining a pattern of uniformly spaced rectangular openings 18 extending the entire length and circumference of the frame. The frame may be comprised of a plastic material such as polyethylene, polypropylene, or nylon. Openings 18 have a size large enough to allow expanding absorber materials, which are restrained from substantial external expansion, to move inwardly and occupy the cavity defined by the frame. Openings having both a width and a length of one-half inch are suitable for this purpose.

A layer 20 of unwoven hydrophilic material, which may take the form of a loosely packed cotton pad, is disposed to cover the entire wall of the frame 12 on the outside thereof. The pad may also be made of other hydrophilic material such as cellulose acetate. The inside surface of this layer has adhered thereto a highly absorbent polymeric material in the form of particles 22. A preferred material is a crosslinked potassium polyacrylate-polyacrylamide copolymer available under the designation Stocksorb 300 from Stockhausen, Inc., Greensboro, N.C. Other highly absorbent materials which may be used include "Favor Sab 900," a polyacrylic acid-polyalcohol grafted copolymer and "Stocksorb 200 NH," an acrylamide acrylic acid, ammonium acrylate copolymer available from the same source.

In addition to supporting the highly absorbent polymer, the unwoven pad layer may be treated to enhance its absorptive capability. An effective treatment comprises contacting the pad with an aqueous solution of a surfactant, by means of which the pad is made preferentially water wet and hydrophilic to a greater degree. A preferred surfactant for this purpose is an amine perfluoroalkyl sulfonate fluorsurfactant available from 3M Industrial Products Division under the designation "FC-99." Other surfactants may also be used. After treatment, the pad is kept in moistened condition by being enclosed in an impermeable cover to maintain its enhanced absorption capability until put into use.

In addition to a surfactant, the aqueous solution used to moisten the pad may preferably include a water-miscible antifreeze liquid such as ethylene glycol ether. This serves to prevent absorbed water from freezing and enhances movement of water at cold temperatures.

A fabric wrapping 24 around the outside of pad layer 22 encloses the pad and end areas of the device. Properties of the fabric are selected to prevent escape of polymer particles into the tank while providing for effective penetration by any water with which the fabric comes into contact. Tightly-woven cotton fabric such as bleached, undyed cotton muslin fabric may be used. A wrapping made of two layers of such a fabric is preferred. This fabric wrapping, as a result of being placed in contact with the moistened, surfactant-treated pad, also becomes moistened and is rendered preferentially water wet along with the pad.

An outer sleeve 26 of open mesh plastic screen-like material encloses the entire device and restrains the fabric and pad layers from outwardly expanding in a radial direction to a significant extent. Flexible screen material made up of polyethylene polypropylene or nylon and having intersecting filaments defining diamond-shaped openings may be used for this purpose. The screen material is stretched tightly and secured at ends of the device by plastic ties 30 engaging end portions 28 of the screen material. Cord 36, which provides a tether, is also secured by tie 30. The cord is enclosed in a plastic sleeve 38 of limited flexibility, which restrains the cord from becoming kinked or knotted. Distal end 39 of the cord is tied onto a swivel 40, which in turn is engaged by a clip 42.

In operation, the device is inserted into a fuel cap opening of a fuel tank and is caused to move to the bottom of the tank by means of weight 27, in the form of an elongated, cylindrical metal rod. Clip 42 is then connected to suitable retaining means such as an accessible wire loop (not shown) adjacent to the tank opening. Upon coming into contact with the water at the bottom of the tank, the fabric and pad layers absorb the water and convey it to the particles by capillary action. The polymer particles then take up the water and expand inwardly, eventually filling the hollow space inside the frame. Outward expansion, as pointed out above, is limited and restrained by the outer mesh screen so as to prevent the device from becoming lodged within the tank.

Preparation of devices embodying the invention may be carried out by means of a simple procedure as follows. A loosely packed cotton pad, sized to cover a selected frame of a type previously used for a filter support, is laid down on a surface for application of other necessary materials. In order to provide optimum water-absorbing capacity for most applications, the pad should have a substantial thickness, with a minimum thickness of at least 1/16 inch being preferred. The pad is then sprayed with an aqueous solution containing a surfactant at a concentration such as 5 ml of surfactant per liter of water and an antifreeze, preferably ethylene glycol, at a concentration of 10 ml per liter of water. The aqueous solution is applied in an amount such as to moisten the pad to the touch, without resulting in water runoff. Highly water-absorbent polymeric particles are then sprinkled on the moistened pad and are allowed to adhere and become attached to the pad surface as a result of reacting with the water in the pad and undergoing slight expansion. The pad is then placed on the frame, with the particle-carrying face placed on the inside. Cotton muslin fabric is then wrapped around the pad, with two layers of the fabric preferably being applied. An outer layer of an open mesh screen is then applied over the fabric and is stretched tight and tied at each end, providing a restraint against substantial outward expansion upon absorption of water and forcing this expansion to occur inwardly, filling up the hollow region enclosed by the frame.

The device constructed as described above provides highly effective absorption of water along with other favorable characteristics. Effectiveness of the device is improved by the fabric and pad layers, which initially come into contact with the water and absorb and convey it to the particles by capillary action. Absorption is further facilitated by treating the pad and fabric with an aqueous surfactant solution and thus obtaining more absorption than would be obtained by use of the absorptive polymer particles alone. Loss of polymer particles into the tank where the device is inserted is prevented by the layers of woven fabric outside of the absorptive pad, and external expansion such as would cause the device to become lodged is restrained by the outermost screen layer.

While the invention is described above in terms of a specific embodiment, it is not to be understood as limited thereto, but is limited only as indicated by the appended claims.

I claim:

1. A device for removing water contained in a separate phase at the bottom of a hydrocarbon fuel tank comprising:

an elongated, generally tubular rigid frame having open spaces defined therein;

a substantially thick pad of non-woven hydrophilic fiber material disposed around the outside of said frame and in contact therewith;

particles of a highly water-absorbent polymeric material carried by said pad;

at least one layer of tightly woven, water-wettable fabric enclosing said pad and end regions of said frame;

a liquid permeable outer mesh screen layer restraining said fabric from radially outward expansion upon absorption of water and forcing such expansion to occur in a radially inward direction;

tethering means secured to said device and enabling removal of the same through a fuel introduction opening in said tank; and weighting means for retaining said device in position on said tank bottom.

2. The device as defined in claim 1 wherein said pad comprises loosely packed cotton.

3. The device as defined in claim 2 wherein said pad is wetted with an aqueous solution of a surfactant.

4. The device as defined in claim 3 wherein said surfactant comprises an amine perfluoroalkyl sulfonate.

5. The device as defined in claim 3 including means maintaining said pad in moistened condition until being placed in use.

6. The device as defined in claim 1 wherein said water-wettable fabric comprises cotton muslin.

7. The device as defined in claim 6 including two layers of said fabric wound around said pad.

8. The device as defined in claim 1 wherein said highly-absorbent material comprises a crosslinked potassium polyacrylate-polyacrylamide copolymer.

9. The device as defined in claim 8 wherein said particles are adhered to an inner surface of said pad.

10. The device as defined in claim 1 wherein said frame comprises a tubular structure made up of spaced-apart longitudinal members and circumferential ribs defining rectangular spaces therebetween.

11. The device as defined in claim 1 wherein said weighting means comprises an elongated, conductive metal rod disposed axially within said frame and arranged to provide grounding of static electricity.

12. The device as defined in claim 1 wherein said outer mesh screen comprises intersecting filaments of polypropylene, polyethylene, or nylon defining diamond-shaped openings.

* * * * *